(12) United States Patent
Ohshima

(10) Patent No.: US 9,081,225 B2
(45) Date of Patent: Jul. 14, 2015

(54) LIQUID CRYSTAL DISPLAY DEVICE

(75) Inventor: Yoshinori Ohshima, Chiba (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 268 days.

(21) Appl. No.: 13/590,817

(22) Filed: Aug. 21, 2012

(65) Prior Publication Data

US 2013/0050613 A1 Feb. 28, 2013

(30) Foreign Application Priority Data

Aug. 24, 2011 (JP) ................. 2011-182119

(51) Int. Cl.
  *G02F 1/1335* (2006.01)
  *G02F 1/1333* (2006.01)
(52) U.S. Cl.
  CPC ...... *G02F 1/133526* (2013.01); *G02F 1/13336* (2013.01); *G02F 2001/133562* (2013.01)
(58) Field of Classification Search
  CPC ............ G02F 1/133504; G02F 1/1313; G02F 2001/133331; G02F 1/13336; G02F 1/133526; G02F 2001/133607; G02F 2001/133332; G02F 1/133308; H04N 9/3197
  USPC ..................... 349/112, 5, 11, 58, 73
  See application file for complete search history.

(56) References Cited

U.S. PATENT DOCUMENTS

| | | | |
|---|---|---|---|
| 6,462,794 B1* | 10/2002 | Yoshikawa et al. | 349/95 |
| 2006/0066945 A1* | 3/2006 | Yeo et al. | 359/457 |
| 2008/0007677 A1* | 1/2008 | Enomoto | 349/106 |
| 2012/0075593 A1* | 3/2012 | Kang et al. | 353/38 |

FOREIGN PATENT DOCUMENTS

| | | |
|---|---|---|
| JP | 6-289380 | 10/1994 |
| JP | 7-023318 | 1/1995 |
| JP | 2010-015094 | 1/2010 |

* cited by examiner

*Primary Examiner* — Jessica M Merlin
(74) *Attorney, Agent, or Firm* — Hamre, Schumann, Mueller & Larson, P.C.

(57) ABSTRACT

Provided is a liquid crystal display device which is capable of eliminating a non-display region at a peripheral edge of a display screen, and displaying an image on the entire surface thereof. A backlight unit (22) emits parallel rays. The liquid crystal panel (24) transmits the parallel ray as a unit parallel ray in pixel unit, thereby forming an original image. An image enlarging panel (26) is an optical element having a flat-plate shape. The image enlarging panel (26) causes the unit parallel ray of each pixel to obliquely travel by refraction to shift a position of the unit parallel ray in a flat-plate plane, to thereby forms a display image enlarged the original image. A viewing angle enlarging panel (28) expands an angular distribution of the entering unit parallel ray from the image enlarging panel (26), thereby enlarging a viewing angle of the display image.

1 Claim, 7 Drawing Sheets

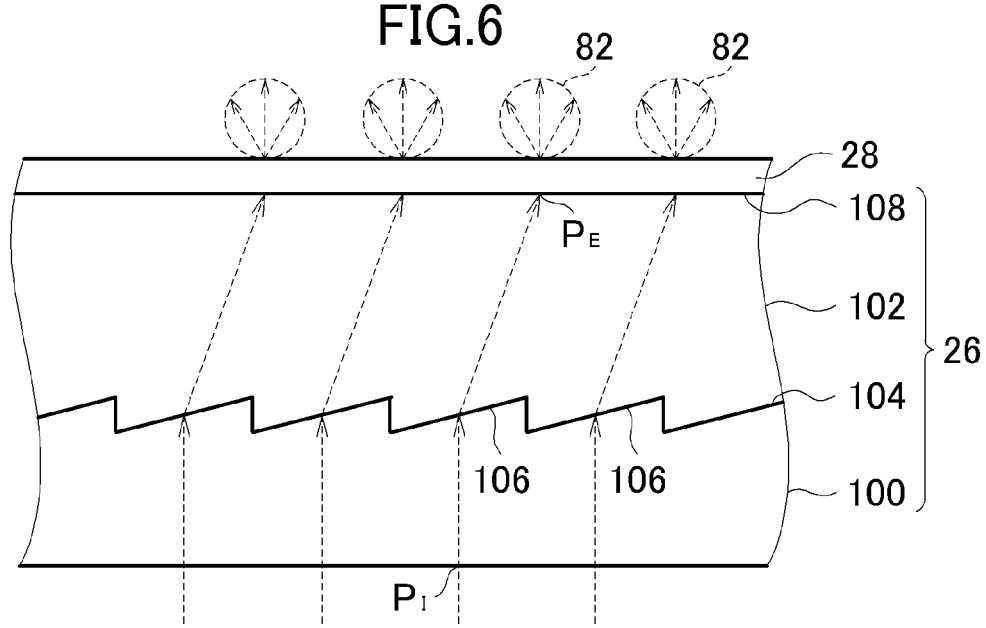
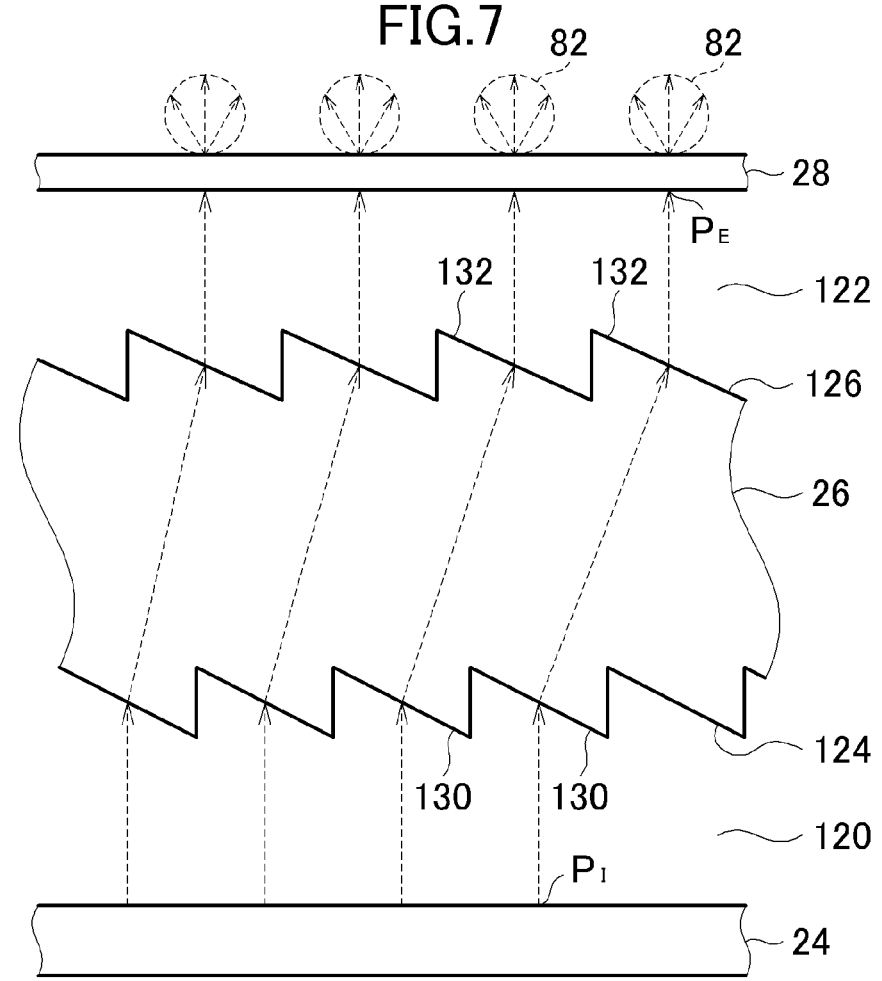

LIQUID CRYSTAL DISPLAY DEVICE

CROSS-REFERENCE TO RELATED APPLICATION

The present application claims priority from Japanese application JP 2011-182119 filed on Aug. 24, 2011, the content of which is hereby incorporated by reference into this application.

BACKGROUND OF THE INVENTION

1. Field of the Invention

The present invention relates to a liquid crystal display device, and more particularly, to reduction or elimination of a non-display region (bezel) at a peripheral edge of a display screen.

2. Description of the Related Art

A liquid crystal panel (liquid crystal cell) used in a liquid crystal display device has a non-display region on an outer side of an effective display region in which pixels are arranged. On a glass substrate of the liquid crystal panel, thin film transistors (TFTs), gate signal lines, source signal lines, and the like are arranged in the effective display region, and a gate driver and a source driver for applying signals to those signal lines to drive the TFTs are arranged outside the effective display region. For arrangement of those drivers and the like, the non-display region is necessary at a peripheral edge portion of the liquid crystal panel. Note that, in the liquid crystal display device, the non-display region of the liquid crystal panel is covered with a front bezel (frame). Conventionally, an effort has been made to reduce the non-display region and thin the bezel.

Further, there has been proposed a liquid crystal display device having a structure in which a convex lens is arranged on a front surface of the liquid crystal panel, thereby displaying an image of the effective display region so as to be larger than the effective display region (Japanese Patent Application Laid-open Nos. 2010-15094, Hei 06-289380, and Hei 07-23318).

On the other hand, the screen of the liquid crystal display device has been increased in size. In applications for digital signage, exhibition, and the like, however, there are cases where a larger screen display is demanded. In such cases, a multi-display is used, in which screens of a plurality of liquid crystal display devices are arranged in a tile pattern to enable one screen display.

SUMMARY OF THE INVENTION

There is a limit to reduction of area on the substrate of members such as drivers arranged at the peripheral edge portion of the liquid crystal panel, and it is difficult to eliminate the non-display region of the liquid crystal panel.

Further, when the convex lens is arranged on the front surface of the liquid crystal panel, there may be generated a difference in how the image is visible depending on viewing points, or the visible image may be distorted from an image displayed on the liquid crystal panel. FIG. 9 is a schematic vertical sectional view of a liquid crystal display device 6 in which a convex lens 4 is arranged on a front surface of a liquid crystal panel 2. A pixel A positioned at the center of the liquid crystal panel 2 is visible at a correct position A (or $A_1$) when the pixel A is viewed from a viewing point $P_1$ being a position directly opposed to the pixel A. However, when the pixel A is viewed from viewing points $P_2$ and $P_3$ being positions laterally shifted from the viewing point $P_1$, because a ray exiting from the pixel A is refracted at a surface of the convex lens 4 and then reaches to the observer, the image of the pixel A is visible on a line of sight deflected from a direction in which the pixel A is actually present. For example, the pixel A is visible as if the pixel A is displayed at a point $A_2$ or $A_3$ on the surface of the convex lens. FIG. 10 is a schematic vertical sectional view of a multi-display in which the liquid crystal display devices of FIG. 9 are arranged. When viewed from a viewing point $P_4$ positioned at a finite distance, the plurality of liquid crystal display devices forming the multi-display are visible in directions different from each other. Specifically, when viewed from the viewing point $P_4$, pixels $A_L$ and $A_R$, which are positioned at centers of liquid crystal panels 2L and 2R of liquid crystal display devices 6L and 6R in FIG. 10, respectively, are visible as if the respective pixels $A_L$ and $A_R$ are displayed at, for example, points $A_5$ and $A_6$ on the surface of the convex lens. The amount of shift of each of the points $A_5$ and $A_6$ with respect to a position of the center pixel visible when each of the liquid crystal display devices 6L and 6R is viewed from the viewing point directly opposed to its center pixel (corresponding to point $A_1$ of FIG. 9) differs depending on the liquid crystal display devices forming the multi-display, and also changes depending on the position of the viewing point $P_4$. As described above, in the liquid crystal display device in which the convex lens is arranged on its front surface to enlarge an image, there is a problem in that the image on the single display or the image on the multi-display does not faithfully express the original image.

The present invention has been made to solve the above-mentioned problems, and provides a liquid crystal display device which is capable of displaying a correct image, and in which a ratio of an effective display region in a front surface thereof is enlarged.

According to an exemplary embodiment of the present invention, there is provided a liquid crystal display device, including: a planar light source that emits parallel rays; a transmissive liquid crystal panel which includes a plurality of pixels arranged in an image formation region, the plurality of pixels passing through the parallel rays applied to a rear surface of the transmissive liquid crystal panel and each of the plurality of pixels outputting the parallel rays as a unit parallel ray in pixel unit, to thereby form an original image on a front surface of the image formation region; an optical panel, which is an optical element having a flat-plate shape and arranged so that a rear surface thereof is directed to the transmissive liquid crystal panel, for enlarging the original image to form a display image on a front surface of the optical panel, the optical panel causing the unit parallel ray of each of the plurality of pixels to obliquely travel by refraction so that an incident position and an exit position of the unit parallel ray are shifted from each other in a flat-plate plane, thereby causing the unit parallel ray to exit from a pixel projection section corresponding to the each of the plurality of pixels at an image display region which forms the display image; and viewing angle enlarging means which is arranged so that a rear surface thereof is directed to the optical panel, and allows the unit parallel ray from the optical panel to enter, the viewing angle enlarging means generating a dispersed ray by expanding an angular distribution of the unit parallel ray and exiting the dispersed ray from a front surface of the viewing angle enlarging means, thereby enlarging a viewing angle of the display image.

According to another exemplary embodiment of the present invention, in the liquid crystal display device, the optical panel includes a laminated structure including: a rear surface layer positioned on the rear surface side of the optical panel; a front surface layer positioned on the front surface side of the optical panel; and an intermediate layer sandwiched between the rear surface layer and the front surface layer. The rear surface layer and the front surface layer each have a refractive index that is higher than a refractive index of the intermediate layer. The optical panel further includes, for the each of the plurality of pixels: a first refraction surface, which is a part of a boundary surface between the rear surface layer and the intermediate layer, the part being opposed to the each of the plurality of pixels; and a second refraction surface, which is a part of a boundary surface between the intermediate layer and the front surface layer, the part being opposed to the pixel projection section corresponding to the each of the plurality of pixels. A direction of the first refraction surface of the each of the plurality of pixels and an interval between the first refraction surface and the second refraction surface in a normal direction toward the optical panel are set so that the unit parallel ray which is refracted at the first refraction surface and obliquely travels in the intermediate layer enters the second refraction surface. A direction of the second refraction surface is set so that the unit parallel ray obliquely traveling in the intermediate layer is refracted toward the normal direction.

According to still another exemplary embodiment of the present invention, in the liquid crystal display device, the optical panel includes a laminated structure including: a rear surface layer positioned on the rear surface side of the optical panel; and a front surface layer positioned on the front surface side of the optical panel. The rear surface layer has a refractive index that is higher than a refractive index of the front surface layer. The optical panel further includes, for the each of the plurality of pixels, a refraction surface, which is a part of a boundary surface between the rear surface layer and the front surface layer, the part being opposed to the each of the plurality of pixels. A direction of the refraction surface of the each of the plurality of pixels and a distance from the refraction surface to a front surface of the front surface layer are set so that the unit parallel ray which is refracted at the refraction surface and obliquely travels in the front surface layer enters the pixel projection section at the front surface of the front surface layer. The viewing angle enlarging means is laminated on the front surface of the front surface layer so as to compensate for a difference in an exit direction of the unit parallel ray from the pixel projection section of the optical panel, thereby setting the common angular distribution in the pixel projection section.

According to yet another exemplary embodiment of the present invention, the liquid crystal display device further includes: an air layer between the optical panel and the liquid crystal panel; and an air layer between the optical panel and the viewing angle enlarging means. In the liquid crystal display device, the optical panel has a refractive index that is higher than a refractive index of the air layers. The optical panel includes, for the each of the plurality of pixels: a first refraction surface, which is a part of a boundary surface between the rear surface of the optical panel and the air layer between the optical panel and the liquid crystal panel, the part being opposed to the each of the plurality of pixels; and a second refraction surface, which is a part of a boundary surface between the front surface of the optical panel and the air layer between the optical panel and the viewing angle enlarging means, the part being opposed to the pixel projection section corresponding to the each of the plurality of pixels. A direction of the first refraction surface of the each of the plurality of pixels and an interval between the first refraction surface and the second refraction surface in a normal direction toward the optical panel are set so that the unit parallel ray which is refracted at the first refraction surface and obliquely travels in the optical panel enters the second refraction surface. A direction of the second refraction surface is set so that the unit parallel ray obliquely traveling in the optical panel is refracted in the normal direction to exit to the air layer between the optical panel and the viewing angle enlarging means.

BRIEF DESCRIPTION OF THE DRAWINGS

In the accompanying drawings:

FIG. 6 is a schematic view of a part of a vertical cross section of an image enlarging panel and a viewing angle enlarging panel according to a second embodiment of the present invention;

FIG. 7 is a schematic view of a part of a vertical cross section of an image enlarging panel and a viewing angle enlarging panel according to a third embodiment of the present invention;

DETAILED DESCRIPTION OF THE INVENTION

Hereinafter, a mode for carrying out the present invention (hereinafter, referred to as embodiment) is described with reference to the drawings.

First Embodiment

Figure 1:
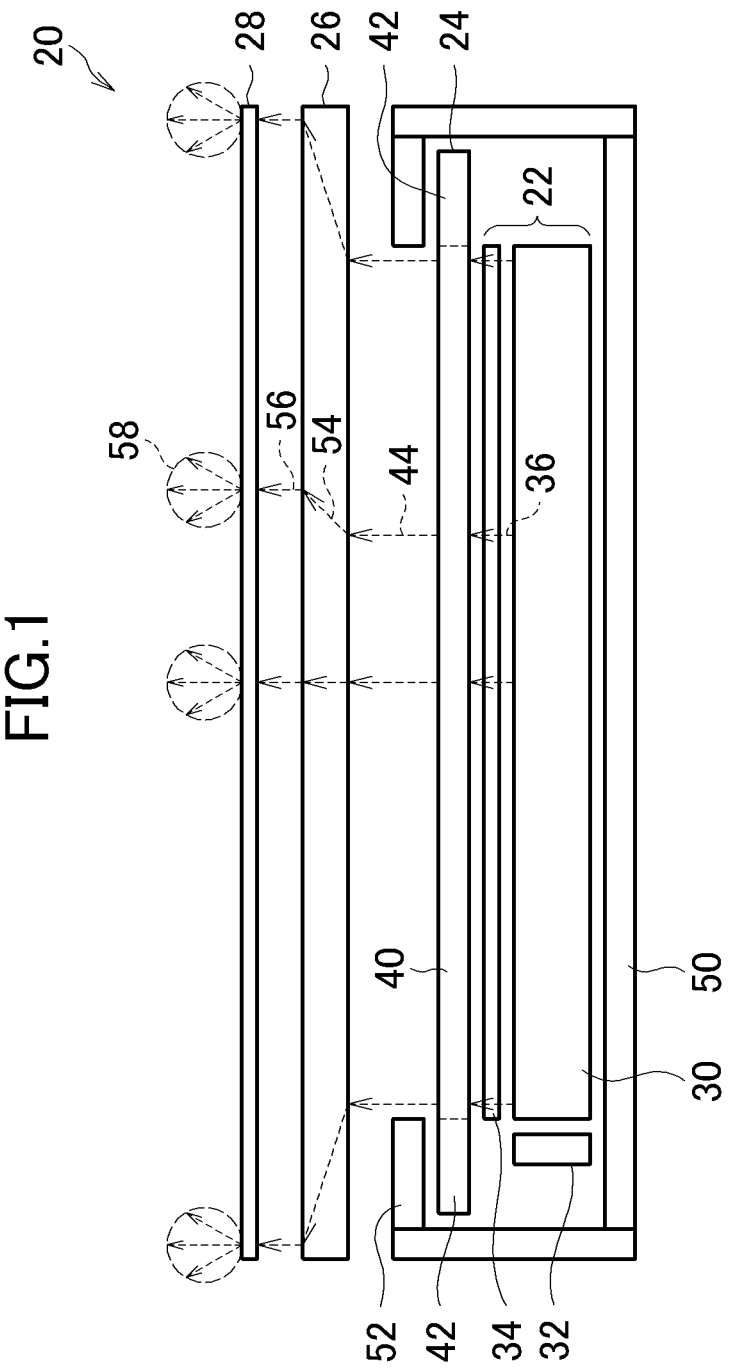
FIG. 1 is a schematic vertical sectional view of a liquid crystal display device according to embodiments of the present invention.

FIG. 1 is a schematic vertical sectional view of a liquid crystal display device 20 according to an embodiment of the present invention. It is assumed herein that a lateral direction (horizontal direction) of a display screen of the liquid crystal display device 20 is an X axis of an XYZ orthogonal coordinate system, a longitudinal direction (vertical direction) of the display screen is a Y axis thereof, and a normal direction toward the display screen is a Z axis thereof. The liquid crystal display device 20 includes a backlight unit 22, a liquid crystal panel 24, an image enlarging panel 26, and a viewing angle enlarging panel 28.

The backlight unit 22 is a planar light source which illuminates a rear surface of the liquid crystal panel 24 at a uniform intensity. Particularly in this embodiment, the backlight unit 22 emits parallel rays from its front surface in the normal direction (Z-axis direction). For example, the backlight unit 22 has an edge light type structure. As illustrated in FIG. 1, the backlight unit 22 includes a light guide plate 30 arranged along the liquid crystal panel 24, a light emitting diode (LED) 32 arranged on a side surface of the light guide plate 30, and an optical sheet group 34 including optical sheets laminated on a front surface of the light guide plate 30. Note that, illustration of members forming the backlight unit 22 such as a reflecting sheet, which is laminated on a rear surface of the light guide plate 30, or a reflecting structure, which is formed by white printing or a concave pattern on the rear surface, is omitted.

The LED 32 causes white light to enter the light guide plate 30. The light guide plate 30 causes the incident light from the LED 32 to travel in a plate-surface direction through reflection at surfaces thereof, to thereby extract light from the front surface at a uniform intensity. The optical sheet group 34 includes a diffusion sheet for diffusing the light which exits from the front surface of the light guide plate 30, to thereby enhance uniformity of the light intensity in the light emission surface, and a prism sheet for condensing light which exits in various directions forward the diffusion sheet, to thereby concentrate an angular distribution of the light to a direction perpendicular to the light emission surface. With this structure, outgoing light 36 from the backlight unit 22 becomes a parallel ray.

The liquid crystal panel 24 has its rear surface arranged so as to be opposed to the front surface of the backlight unit 22. The liquid crystal panel 24 includes an effective display region 40 (image formation region) in which pixels are arranged, and a non-display region 42 being a peripheral edge portion of the liquid crystal panel 24. Each of the pixels is basically formed of a plurality of sub-pixels. That is, one pixel region is separated into a plurality of sub-pixel regions, and color filters having different colors, for example, color filters for red (R), green (G), and blue (B) are formed with respect to the sub-pixel regions. In each of the sub-pixels, liquid-crystal molecular orientation is controlled in accordance with voltages to be applied to a gate signal line and a source signal line, thereby changing transmittance with respect to light emitted from the backlight unit 22. In this manner, color and brightness of light passing through each pixel in the effective display region 40 of the liquid crystal panel 24 are controlled, and an original image is formed on a front surface of the effective display region 40. The original image is an original of an image to be displayed by the liquid crystal display device 20.

The color filter is formed so that the parallel rays that have passed through the liquid crystal panel 24 from the rear surface side thereof are basically kept as parallel rays, that is, so that the parallel rays pass through the liquid crystal panel 24 without being scattered or refracted. With this, each of the pixel regions (or a sub-pixel region group forming the pixel region) of the liquid crystal panel 24 causes the parallel ray to exit, the parallel ray corresponding to the color and brightness that the pixel expresses. This parallel ray is referred to as a unit parallel ray 44 herein.

Note that, in the non-display region, a gate driver and a source driver are arranged.

The backlight unit 22 and the liquid crystal panel 24 are housed in, for example, a frame 50 made of a metal. On a front surface side of the frame 50, a front bezel 52 is provided. The front bezel 52 covers the non-display region 42 which is the peripheral edge portion of the liquid crystal panel 24. The front bezel 52 does not cover the effective display region 40, and the parallel rays passing through the effective display region 40 exit forward.

The image enlarging panel 26 (optical panel) has its rear surface directed to the front surface of the liquid crystal panel 24, and is arranged in front of the front bezel 52 when viewed from the display screen side of the liquid crystal display device 20. The image enlarging panel 26 is an optical element having a flat-plate shape, which allows the rays representing the original image formed by the liquid crystal panel 24 to enter the rear surface thereof, and forms an enlarged image of the original image on a front surface thereof. The image formed on the surface of the image enlarging panel 26 is basically a display image of the liquid crystal display device 20.

The image enlarging panel 26 causes the unit parallel ray of each of the pixels of the original image to obliquely travel by refraction, thereby shifting an exit position of the ray from an incident position thereof in the plane of the image enlarging panel 26 (XY plane) (oblique ray 54). Thus, the image enlarging panel 26 causes the unit parallel ray to exit from, among pixel projection sections corresponding to pixels in an image display region forming the display image, a pixel projection section corresponding to the pixel of the original image.

The image enlarging panel 26 forms the display image obtained by enlarging the original image on the front surface thereof. Therefore, the size of the image enlarging panel 26 in the X and Y directions is formed larger than that of the effective display region 40 of the liquid crystal panel 24, and specifically, the image enlarging panel 26 extends in front of the front bezel 52. In FIG. 1, the size of the image enlarging panel 26 in horizontal directions (X and Y directions) is set so as to match the size of the frame 50, but the size of the image enlarging panel 26 may be set so as to match the size of the liquid crystal display device 20 in the X and Y directions. In this manner, the display screen of the liquid crystal display device 20 can be frame-less.

The viewing angle enlarging panel 28 (viewing angle enlarging means) has its rear surface arranged so as to be directed to the image enlarging panel 26, and allows a unit parallel ray 56 to enter, the unit parallel ray 56 exiting from each pixel projection section of the image enlarging panel 26. Further, the viewing angle enlarging panel 28 causes each of the unit parallel rays to exit from a front surface thereof while expanding an angular distribution 58 of the each of the unit parallel rays, thereby enlarging the viewing angle of the display image. That is, the viewing angle enlarging panel 28 causes each of the unit parallel rays directed to the normal direction toward the panel surface to disperse so that bundle of rays forming the unit parallel ray are distributed along the X and Y directions with the normal direction as a center. For example, the viewing angle enlarging panel 28 can be formed with use of diffusion beads or a microlens array.

Figure 2:
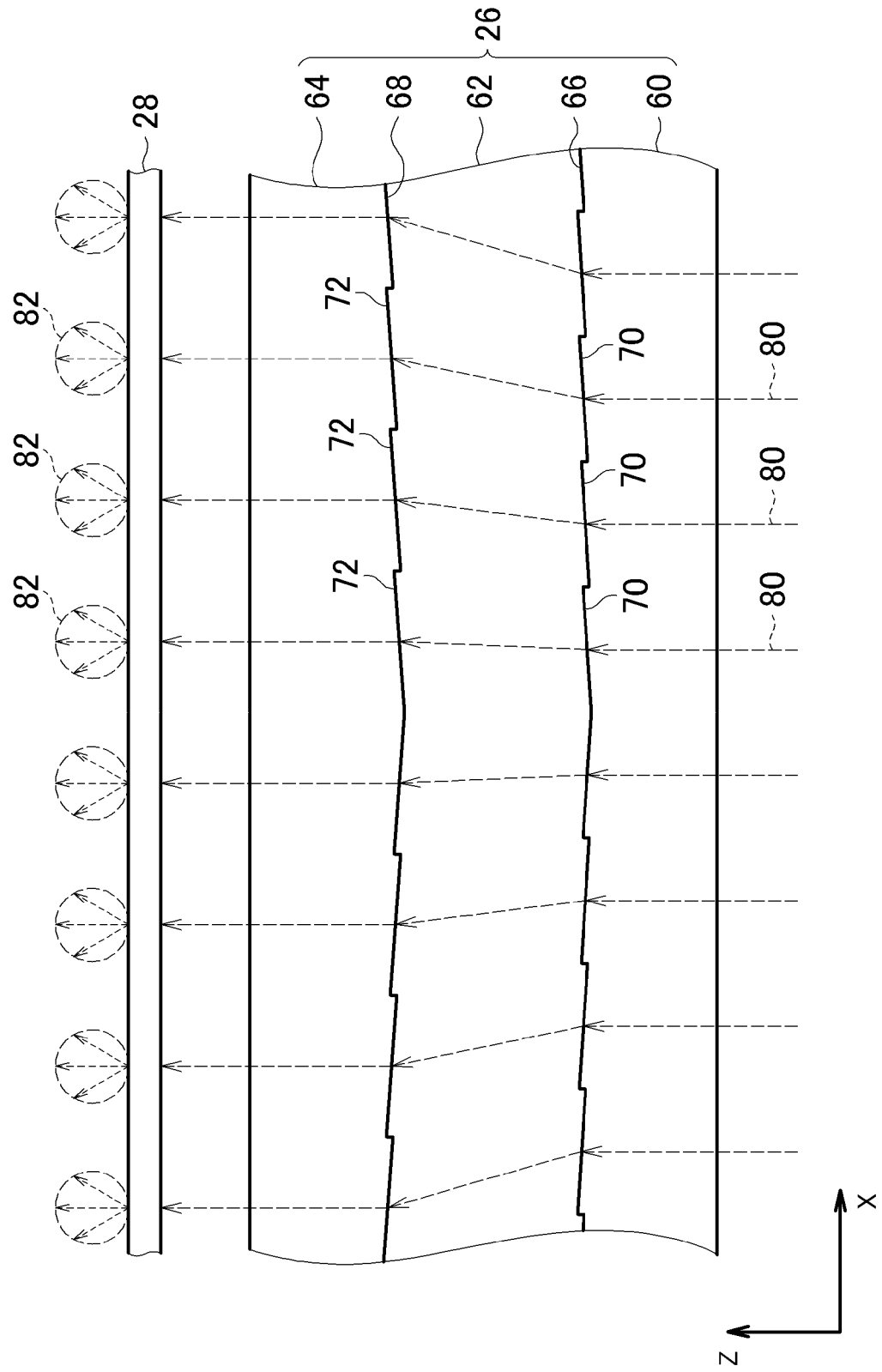
FIG. 2 is a schematic view of a vertical cross section of an image enlarging panel and a viewing angle enlarging panel of the first embodiment, at a center portion of the enlarging panels in a horizontal direction.
Figure 3:
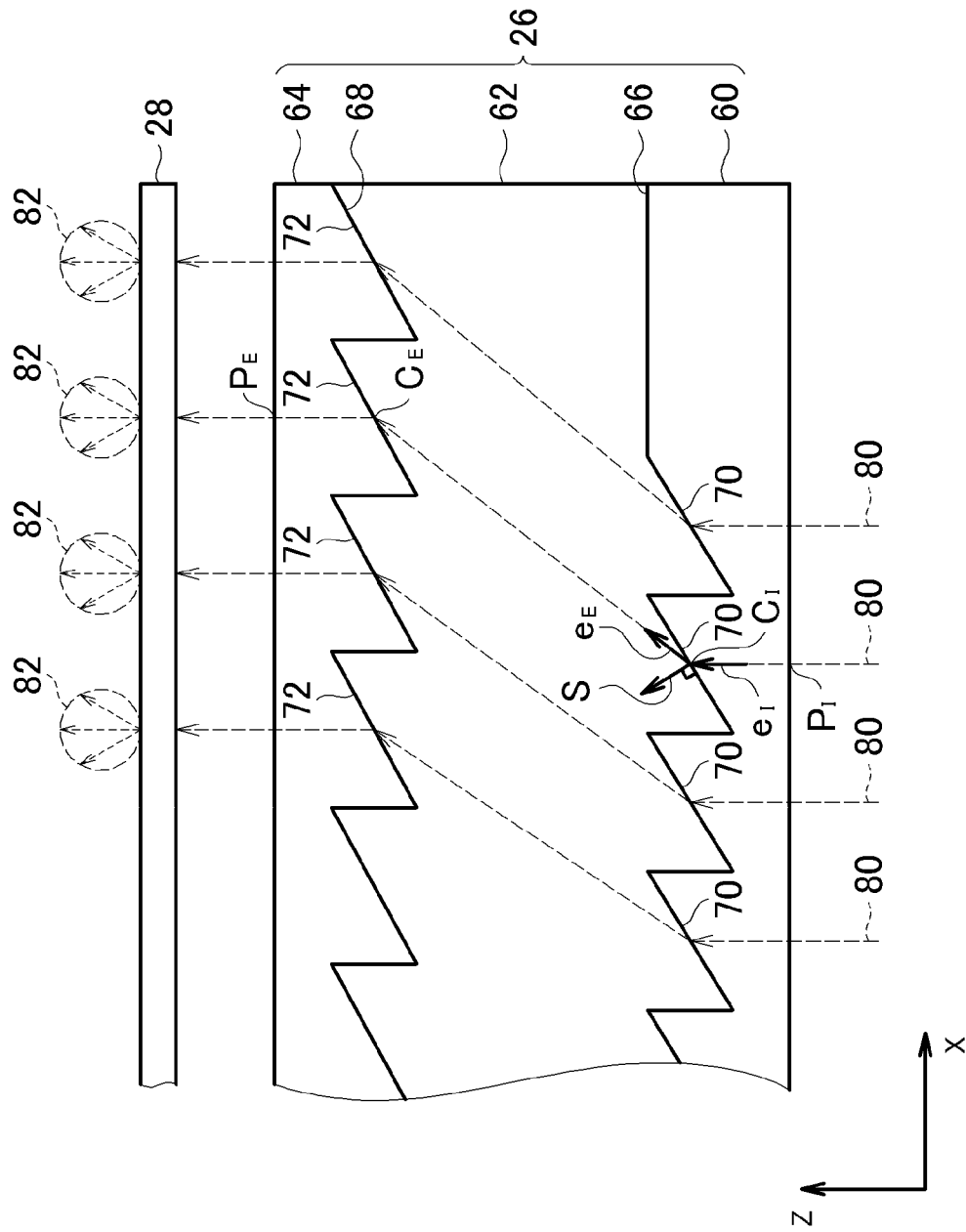
FIG. 3 is a schematic view of a vertical cross section of the image enlarging panel and the viewing angle enlarging panel of the first embodiment, at an edge portion the enlarging panels in the horizontal direction.

FIGS. 2 and 3 are partial sectional views of the image enlarging panel 26 and the viewing angle enlarging panel 28. FIG. 2 is an enlarged view of a vertical cross section at a center portion of the liquid crystal display device 20 in the horizontal direction (X direction), and FIG. 3 is an enlarged view of an edge portion thereof in the X direction. Note that, the right side of FIG. 3 is the edge, and the left side thereof is the center side. The image enlarging panel 26 of this embodiment has a laminated structure in which three layers of a rear surface layer 60, an intermediate layer 62, and a front surface layer 64 are laminated in order. The rear surface layer 60 and the front surface layer 64 have a refractive index that is higher than that of the intermediate layer 62. When the refractive indices of the rear surface layer 60, the intermediate layer 62, and the front surface layer 64 are represented by $n_R$, $n_M$, $n_F$, respectively, the respective layers are made of materials satisfying $n_R > n_M$ and $n_F > n_M$. In this embodiment, in order to simplify the description, it is assumed that the rear surface layer 60 and the front surface layer 64 are made of the same material. In view of workability of the respective layers, a transparent resin is preferably used. For example, the rear surface layer 60 and the front surface layer 64 are made of polycarbonate (PC, refractive index n=1.58), polymethylmethacrylate (PMMA, n=1.49), or polystyrene (PS, n=1.59). There exits fluoropolymer having a refractive index n of around 1.35, and such fluoropolymer may be used for the intermediate layer 62. An example of the fluoropolymer includes CYTOP (trademark of ASAHI GLASS CO., LTD., n=1.34).

A boundary surface 66 between the rear surface layer 60 and the intermediate layer 62 and a boundary surface 68 between the intermediate layer 62 and the front surface layer 64 each refract the unit parallel ray so that the unit parallel ray entering a position $(x_I, y_I)$ (hereinafter, the position is represented as $P_I$) of the rear surface of the image enlarging panel 26 exits in the Z axis direction from a target position $(x_E, y_E)$ (hereinafter, the position is represented as $P_E$) of the front surface thereof, which is a position in the XY plane shifted from the incident position $P_I$. Therefore, each of the boundary surfaces 66 and 68 is provided with element boundary surfaces corresponding to the respective unit parallel rays. The element boundary surface (first refraction surface) of the boundary surface 66 and the element boundary surface (second refraction surface) of the boundary surface 68, which correspond to each unit parallel ray, are provided at positions $P_I$ and $P_E$ in the XY plane, and the direction (inclination) of those surfaces and an interval therebetween in the Z direction are set so that the unit parallel ray can exit from the target position in the Z axis direction. Note that, the above-mentioned incident position $P_I$ and exit position $P_E$ of the unit parallel ray unit are positions of a center of a cross section of the parallel ray.

The unit parallel ray entering the image enlarging panel 26 has a cross section in the shape and size of a pixel region through which the unit parallel ray passes in the liquid crystal panel 24. Further, in this embodiment, the unit parallel ray which exits from the image enlarging panel 26 basically has a cross section in the same shape and size as the pixel region as well. In this embodiment, the center of the effective display region 40 of the liquid crystal panel 24 matches with the center of the display screen of the liquid crystal display device 20, and the positions of the pixels in the image enlarging panel 26 are symmetrically shifted vertically and horizontally. Hereinafter, in order to simplify the description, it is assumed that the effective display region 40 of the liquid crystal panel 24 has a matrix of $2N_X$ pixels in the X direction and $2N_Y$ pixels in the Y direction, and a common center of the effective display region 40 and the display screen of the liquid crystal display device 20 is set to an origin of the XY plane. Under this assumption, description is made of a positional dependence of the element boundary surfaces in a region that satisfies $X \geq 0$ and $Y \geq 0$ of the four regions divided vertically and horizontally, that is, in the first quadrant of the XY plane.

An arbitrary pixel among pixels arranged in the first quadrant in matrix with $N_X$ pixels in the horizontal direction and $N_Y$ pixels in the vertical direction is designated by $\langle k_X, k_Y \rangle$ which is a combination of an index $k_X$ in the X direction and an index $k_Y$ in the Y direction. Further, the unit parallel ray and the element boundary surface corresponding to the pixel can be designated by the index $\langle k_X, k_Y \rangle$. In this embodiment, $k_X$ and $k_Y$ are natural numbers equal to or smaller than $N_X$ and $N_Y$, respectively, and the index of the pixel closest to the origin of the XY plane is $\langle 1,1 \rangle$. It is defined that $k_X$ and $k_Y$ increase in the positive direction of the X axis and the Y axis, respectively.

When an interval (pixel pitch) of the pixel arrangement in the liquid crystal panel 24 in the horizontal direction (X direction) is represented by $p_X$, and that in the vertical direction (Y direction) is represented by $p_Y$, the pixel region of $\langle k_X, k_Y \rangle$ is a rectangular region formed of points (x,y) satisfying $p_X(k_X-1) < x < p_X k_X$ and $p_Y(k_Y-1) < y < p_Y k_Y$. The position of the first refraction surface of the pixel in the XY plane is also in the above-mentioned region, and a set of center coordinates $P_I$ thereof is $(p_X(k_X-\frac{1}{2}), p_Y(k_Y-\frac{1}{2}))$. Note that, in this embodiment, description is simplified by ignoring a gap among the pixels such as a black matrix region.

Intervals (pitches) in the X direction and the Y direction in the pixel projection section on the front surface of the image enlarging panel 26 are represented by $q_X$ and $q_Y$, respectively. In this embodiment, the image enlarging panel 26 enlarges the original image represented by rays entering the rear surface thereof and causes the rays representing the enlarged original image to exit from the front surface thereof. Therefore, $q_X > p_X$ and $q_Y > p_Y$ are satisfied. A set of center coordinates $P_E$ of the pixel projection section corresponding to the pixel of $\langle k_X, k_Y \rangle$ is $(q_X(k_X-\frac{1}{2}), q_Y(k_Y-\frac{1}{2}))$. In this embodiment, a second refraction surface 72 corresponding to the pixel of $\langle k_X, k_Y \rangle$ is set to a rectangular region satisfying $q_X(k_X-1) < x < q_X k_X$ and $q_Y(k_Y-1) < y < q_Y k_Y$ in the XY plane with the point $P_E$ as a center.

The refraction of the unit parallel ray at each of a first refraction surface 70 and the second refraction surface 72 can be calculated using the Snell's law. A directional vector $e_I$ of the entering unit parallel ray at the first refraction surface 70 is fixed to the Z axis direction, and hence from the Snell's law, a directional vector $e_E$ of the refracted light at the first refraction surface 70, that is, of the unit parallel ray obliquely traveling in the intermediate layer 62 is determined in accordance with a normal vector S at the first refraction surface 70. When the X, Y, and Z coordinate components of the vector $e_E$ are represented by $\xi_X$, $\xi_Y$, and $\xi_Z$, respectively, and differences between a point $C_I$ positioned at $P_I$ of the first refraction surface 70 and a point $C_E$ positioned at $P_E$ of the second refraction surface 72 in X, Y, and Z coordinates are represented by $\Delta x$, $\Delta y$, and $\Delta z$, respectively, first, from the above-mentioned coordinates of $P_I$ and $P_E$, the following expressions can be obtained.

$$\Delta x = (q_X - p_X) \cdot (k_X - \tfrac{1}{2}) \tag{1}$$

$$\Delta y = (q_Y - p_Y) \cdot (k_Y - \tfrac{1}{2}) \tag{2}$$

Further, in the unit parallel ray obliquely traveling in the intermediate layer 62, when a proportionality factor of a vector of a ray having a start point of $C_I$ and an end point of $C_E$ and a directional vector $e_E$ thereof is represented by $\alpha$, the following expressions are satisfied.

$$\Delta x = \alpha \xi_X \tag{3}$$

$$\Delta y = \alpha \xi_Y \tag{4}$$

$$\Delta z = \alpha \xi_Z \tag{5}$$

Further, when the directional vector $e_E$ is defined by a unit vector, the following expression is satisfied.

$$\xi_X^2 + \xi_Y^2 + \xi_Z^2 = 1 \tag{6}$$

It could be understood that, from the expressions (1) to (6), $\Delta z$ and the vector $e_E$ are determined with $\alpha$ as a parameter.

That is, depending on the value of α, the direction of the first refraction surface 70 and the distance between the first refraction surface 70 and the second refraction surface 72 in the Z direction are set. For example, when Δz of an arbitrary pixel <$k_X$, $k_Y$> is set constant and merely the direction of the first refraction surface 70 of the arbitrary pixel <$k_X$, $k_Y$> is changed, the unit parallel ray can be guided to the target position $P_E$ corresponding to each pixel. In contrast, when the direction of the first refraction surface 70 of an arbitrary pixel <$k_X$,$k_Y$> is set constant and merely the distance between the first refraction surface 70 and the second refraction surface 72 in the Z direction is changed, the unit parallel ray can be guided to the target position $P_E$ corresponding to each pixel. However, for example, in the design in which Δz is maintained constant, as the difference in position between $P_E$ and $P_I$ becomes larger, the inclination of the first refraction surface 70 increases. As a result, the unit parallel ray entering from the rear surface layer 60 may be totally reflected at the first refraction surface 70 in some cases. Further, in the design in which the inclination of the first refraction surface 70 is maintained constant, as the difference in position between $P_E$ and $P_I$ becomes larger, Δz increases. As a result, the image enlarging panel 26 may be thick. Therefore, it is necessary to consider those points when specifically determining the design. For example, as illustrated in FIGS. 2 and 3, it is possible to employ such a design that the inclination of the first refraction surface 70 and Δz both increase toward the end.

The position of the second refraction surface 72 in the X and Y directions is determined depending on the target exit position $P_E$, and the position thereof in the Z direction is determined depending on the distance Δz with respect to the first refraction surface 70. The direction of the second refraction surface 72 is set so that the unit parallel ray traveling obliquely in the intermediate layer 62 is refracted to the Z axis direction. In this embodiment, the refractive indices of the rear surface layer 60 and the front surface layer 64 are the same, and hence the direction of the second refraction surface 72 is the same as that of the first refraction surface 70, that is, set to be parallel to the first refraction surface 70.

In the above, description is made of one region of the four vertically and horizontally divided regions of the image enlarging panel 26, but the three remaining regions may be similarly structured in consideration of the vertical and horizontal symmetric property.

For example, the image enlarging panel 26 can be manufactured by applying a method of manufacturing an optical sheet such as a diffusion sheet and a prism sheet. For example, on the surface of a resin layer to be formed as the rear surface layer 60, a surface pattern in which the first refraction surfaces 70 corresponding to the respective pixel regions are arranged is formed, and a resin layer to be formed as the intermediate layer 62 is applied thereon and cured. Then, on the surface of the intermediate layer 62, a surface pattern in which the second refraction surfaces 72 are arranged is formed. After that, a resin layer that is to be formed as the front surface layer 64 is applied and cured. The surface pattern in which the first refraction surfaces 70 are arranged and the surface pattern in which the second refraction surfaces 72 are arranged can be formed by transferring the pattern formed on a transfer roll onto the resin surface.

A ray 80 illustrated in FIGS. 2 and 3 schematically represents the unit parallel ray. The ray 80 enters the rear surface layer 60 of the image enlarging panel 26 from the liquid crystal panel 24 in the Z axis direction, and is refracted at the corresponding first refraction surface 70 to obliquely travel in the intermediate layer 62 to reach a target position in the XY plane. Then, the ray 80 is refracted at the second refraction surface 72 provided at the target position to exit from the front surface layer 64 in the Z axis direction. Then, the respective unit parallel rays (rays 80) exiting from the image enlarging panel 26 are given the same angular distribution 82 by the viewing angle enlarging panel 28.

Figure 4:
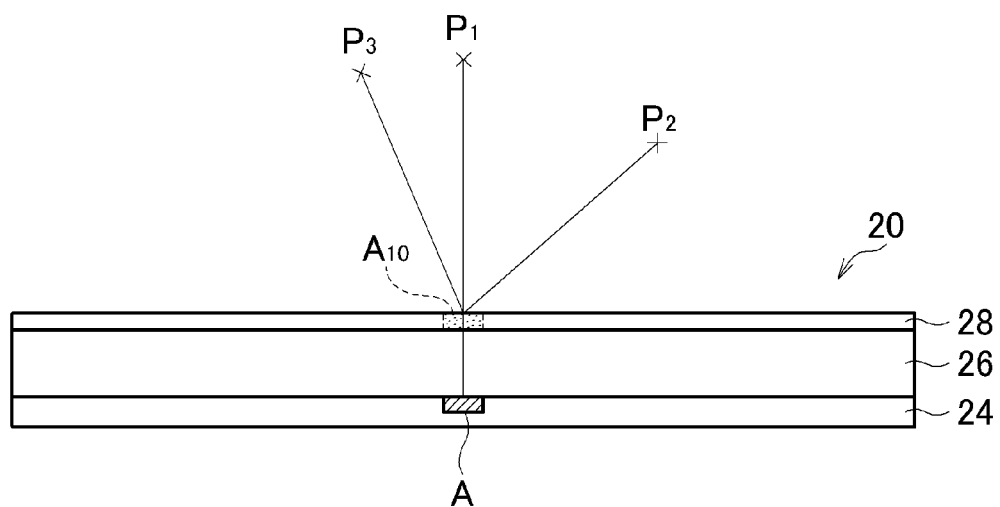
FIG. 4 is a schematic view illustrating how a display image is visible in the liquid crystal display device according to the embodiments of the present invention.
Figure 5:
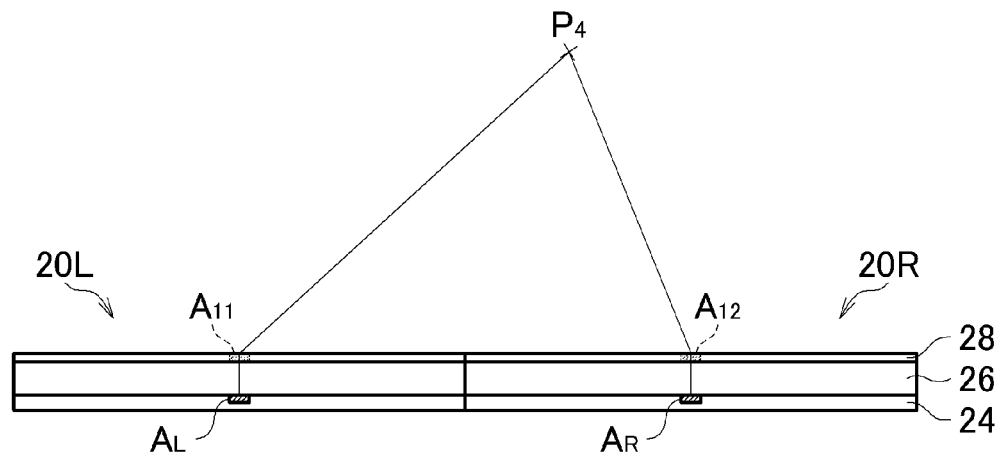
FIG. 5 is a schematic view illustrating how the display image is visible in a multi-display in which the liquid crystal display devices of the embodiments of the present invention are arranged.
Figure 9:
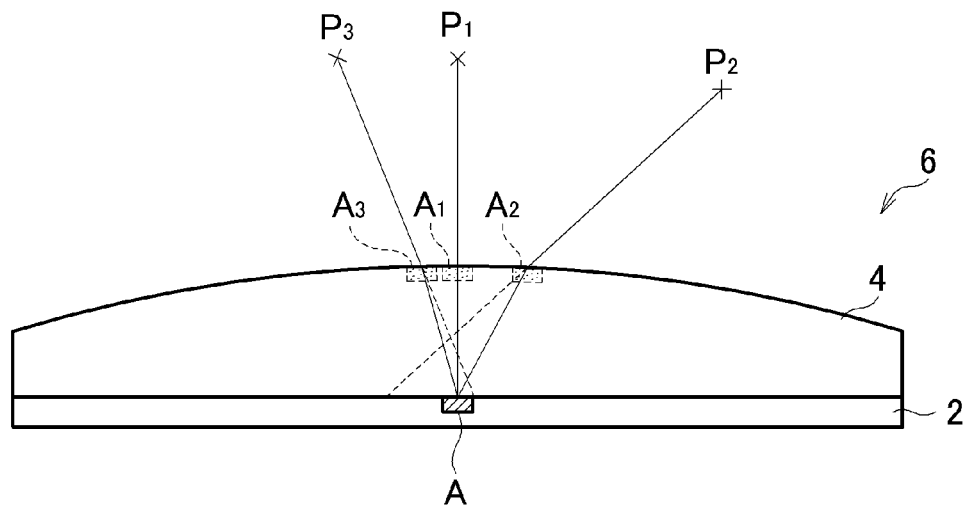
FIG. 9 is a schematic vertical sectional view of a liquid crystal display device according to a conventional technology in which a convex lens is arranged on a front surface of a liquid crystal panel.
Figure 10:
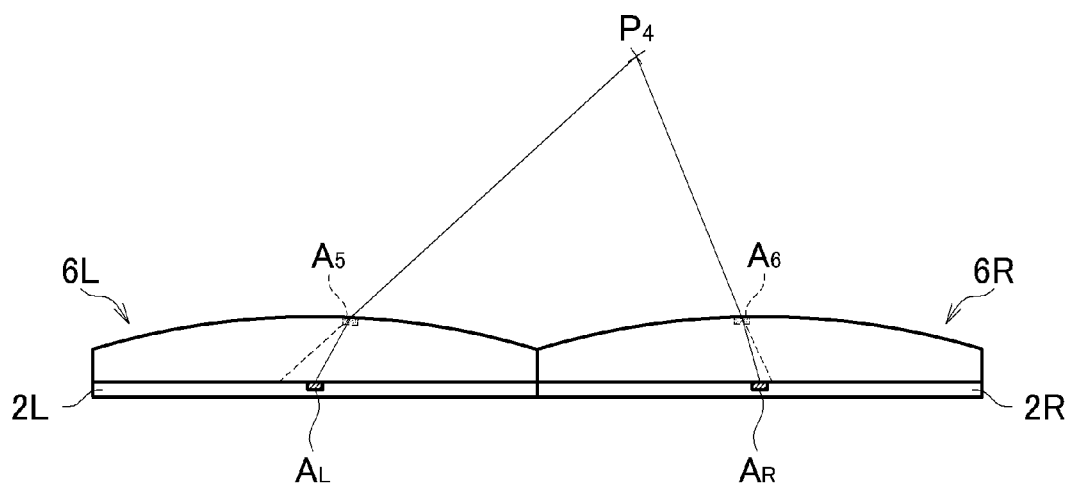
FIG. 10 is a schematic vertical sectional view of a multi-display in which the liquid crystal display devices illustrated in FIG. 9 are arranged.

FIGS. 4 and 5 are schematic views illustrating how the display image is visible in the liquid crystal display device 20. FIG. 4 illustrates a difference of the liquid crystal display device 20 with respect to the conventional liquid crystal display device 6 illustrated in FIG. 9, and FIG. 5 illustrates a difference of a multi-display in which the liquid crystal display devices 20 (liquid crystal display devices 20L and 20R) are arranged with respect to the conventional multi-display illustrated in FIG. 10. That is, as illustrated in FIG. 4, in the liquid crystal display device 20, a pixel A positioned at the center of the liquid crystal panel 24 is visible at a pixel projection section $A_{10}$ corresponding to the pixel A on the front surface of the viewing angle enlarging panel 28 when the pixel A is viewed from a viewing point $P_1$ being a position directly opposed to the pixel A, and also when the pixel A is viewed from viewing points $P_2$ and $P_3$ being positions laterally shifted from the viewing point $P_1$. Further, as illustrated in FIG. 5, respective center pixels $A_L$ and $A_R$ of the liquid crystal display devices 20L and 20R forming the multi-display are visible when viewed from, for example, a viewing point $P_4$ such that the respective center pixels $A_L$ and $A_R$ are displayed at points $A_{11}$ and $A_{12}$ at the centers of the viewing angle enlarging panels 28. In FIGS. 4 and 5, the center pixel is represented for comparison with FIGS. 9 and 10, but an arbitrary pixel of the liquid crystal display device 20 is visible at the same position of the viewing angle enlarging panel 28 even when the viewing point is changed. On the viewing angle enlarging panel 28, the pixel projection sections are set in an arrangement obtained by extending the pixel arrangement of the liquid crystal panel 24 in each of the X and Y directions, and thus an enlarged image of the original image of the liquid crystal panel 24 is displayed. As described above, the visible position of the pixel displayed at each of the pixel projection sections is not shifted even when the viewing point is changed, and hence the liquid crystal display device 20 can suppress image distortion and shift of the image depending on the viewing point, to thereby enable correct image display. In addition, the ratio of the effective display region in the front surface is enlarged, and for example, a frame-less structure may be attained.

Second Embodiment

A schematic structure of a liquid crystal display device according to a second embodiment of the present invention is basically the same as the liquid crystal display device 20 according to the first embodiment illustrated in FIG. 1. In the following description, components similar to those of the first embodiment are represented by the same reference symbols to simplify the description.

The liquid crystal display device 20 of this embodiment differs from that of the first embodiment in the structures of the image enlarging panel 26 and the viewing angle enlarging panel 28. FIG. 6 is a partial sectional view of the image enlarging panel 26 and the viewing angle enlarging panel 28 of this embodiment, and the left side of FIG. 6 is the center side. The image enlarging panel 26 of this embodiment has a laminated structure in which two layers of a rear surface layer 100 and a front surface layer 102 are laminated in order. The rear surface layer 100 has a refractive index that is higher than that of the front surface layer 102. For example, the rear surface layer 100 may be made of the same material as that of the rear surface layer 60 and the front surface layer 64 of the first embodiment, and further, the front surface layer 102 may be made of the same material as that of the intermediate layer 62 of the first embodiment. At a boundary surface 104 between the rear surface layer 100 and the front surface layer 102, refraction surfaces 106 which refract light for the respective unit parallel rays are formed. The boundary surface 104 in which the refraction surfaces 106 are arranged is formed by a method using a transfer roller described in the first embodiment, for example. The viewing angle enlarging panel 28 is arranged in close contact to the front surface of the image enlarging panel 26.

The boundary surface 104 includes the refraction surface 106 as an element boundary surface in an XY region opposed to each pixel region of the liquid crystal panel 24 so that the unit parallel ray entering the position $P_I$ of the rear surface of the image enlarging panel 26 reaches the target position $P_E$ of the front surface, which is a position in the XY plane shifted from the incident position $P_I$. Thus, the boundary surface 104 refracts the unit parallel ray at the refraction surface 106. In this embodiment, the direction of the refraction surface 106 corresponding to each pixel region and the distance Δz in the Z direction from the refraction surface 106 (for example, the center thereof) to the front surface of the front surface layer 102 (boundary surface 108 between the image enlarging panel 26 and the viewing angle enlarging panel 28) are set so that the unit parallel ray that is refracted at the refraction surface 106 and obliquely travels in the front surface layer 102 enters the pixel projection section which is the target position of the boundary surface 108.

The settings of the direction and the position of the refraction surface 106 are basically similar to the settings of the first refraction surface 70 of the first embodiment. Therefore, Δz and the directional vector $e_E$ of light obliquely traveling in the front surface layer 102 are determined with a as a parameter. For example, through setting of Δz to be larger in proportion to the distance of the incident position $P_I$ of the unit parallel ray from the center of the effective display region 40 (origin of the XY plane) in the XY plane, an angle formed between the directional vector $e_E$ and the normal vector toward the image enlarging panel 26, that is, an incident angle of the unit parallel ray to the boundary surface 108 between the image enlarging panel 26 and the viewing angle enlarging panel 28 can be set to the same angle among the respective unit parallel rays. With this setting, it is possible to unify the area that each unit parallel ray illuminates the boundary surface 108 (area of the pixel projection section).

The direction in which the unit parallel ray exits from the front surface layer 102 differs from the case of the first embodiment, and basically differs depending on each pixel (pixel projection section). The viewing angle enlarging panel 28 compensates for the difference of the exiting direction of the unit parallel ray from each of the pixel projection sections of the image enlarging panel 26, to thereby set a common angular distribution 82 for each of the pixel projection sections. For example, the viewing angle enlarging panel 28 can be formed using a microlens array, and the characteristics of a lens group forming the microlens array are set for the respective pixel projection sections, to thereby compensate for the difference of the exiting direction of the unit parallel ray.

Similarly to the first embodiment, the exit positions $P_E$ are set in an arrangement obtained by extending the arrangement of the incident positions $P_I$ corresponding to the pixels of the liquid crystal panel 24 in each of the X and Y directions. Similarly to the liquid crystal display device 20 of the first embodiment, the liquid crystal display device 20 of this embodiment can suppress image distortion and shift of the image depending on the viewing point, to thereby enable correct image display. In addition, the ratio of the effective display region in the front surface is enlarged, and for example, a frame-less structure may be attained.

Third Embodiment

A schematic structure of a liquid crystal display device according to a third embodiment of the present invention is basically the same as the liquid crystal display device 20 according to the first embodiment illustrated in FIG. 1. In the following description, components similar to those of the first embodiment are represented by the same reference symbols to simplify the description.

The liquid crystal display device 20 of this embodiment differs from that of the first embodiment in the structure of the image enlarging panel 26. FIG. 7 is a partial sectional view of the image enlarging panel 26 and the viewing angle enlarging panel 28 of this embodiment, and the left side of FIG. 7 is the center side. An air layer 120 is provided between the image enlarging panel 26 and the liquid crystal panel 24, and an air layer 122 is also provided between the image enlarging panel 26 and the viewing angle enlarging panel 28. The image enlarging panel 26 is made of a material having a refractive index that is higher than that of the air layers.

A boundary surface 124 between the image enlarging panel 26 and the air layer 120 and a boundary surface 126 between the image enlarging panel 26 and the air layer 122 each refract the unit parallel ray so that the unit parallel ray entering the position $P_I$ of the rear surface of the image enlarging panel 26 exits in the Z axis direction from the target position $P_E$ on the front surface thereof, which is a position in the XY plane shifted from the incident position $P_I$. Therefore, each of the boundary surfaces 124 and 126 are provided with element boundary surfaces corresponding to the respective unit parallel rays. The element boundary surface (first refraction surface) of the boundary surface 124 and the element boundary surface (second refraction surface) of the boundary surface 126, which correspond to each unit parallel ray, are provided at positions $P_I$ and $P_E$ in the XY plane, and the direction (inclination) of those surfaces and an interval therebetween in the Z direction are set so that the unit parallel ray can exit from the target position in the Z axis direction. In view of this point, the laminated structure of the image enlarging panel 26 and the air layers 120 and 122 of this embodiment is in common with the image enlarging panel 26 of the first embodiment. The direction of a first refraction surface 130 of each pixel and the interval Δz in the Z direction between the first refraction surface 130 and a second refraction surface 132 corresponding thereto are set so that the unit parallel ray that is refracted at the first refraction surface 130 and obliquely travels in the image enlarging panel 26 enters the second refraction surface 132. Further, the direction of the second refraction surface 132 is set so that the unit parallel ray obliquely traveling in the image enlarging panel 26 is refracted toward the Z axis direction to exit to the air layer 122.

Similarly to the liquid crystal display device 20 of the first embodiment, the liquid crystal display device 20 of this embodiment can also suppress image distortion and shift of the image depending on the viewing point, to thereby enable correct image display. In addition, the ratio of the effective display region in the front surface is enlarged, and for example, a frame-less structure may be attained.

As described above, the air layer 120, the image enlarging panel 26, and the air layer 122 of this embodiment correspond to the rear surface layer 60, the intermediate layer 62, and the front surface layer 64 of the image enlarging panel 26 of the first embodiment, respectively, but this embodiment is basically different from the first embodiment in that the magnitude relationship of refractive indices of those layers are opposite. In accordance with this difference, the magnitude relationship between the incident angle and the refracting angle at the first refraction surface, and the magnitude relationship between the incident angle and the refracting angle at the second refraction surface become opposite in this embodiment and the first embodiment. This point is represented in that the direction of the inclination (downward-sloping inclination) of the first refraction surface 130 and the second refraction surface 132 illustrated in FIG. 7 is opposite to the direction of the inclination (upward-sloping inclination) of the first refraction surface 70 and the second refraction surface 72 of the first embodiment illustrated in FIG. 3. Regarding the relationship between the refracted ray and the direction of the first refraction surface 130 and the second refraction surface 132 of this embodiment, on a passage of ray refracted at the first refraction surface 130 of a certain pixel, a boundary surface other than the second refraction surface 132 corresponding to the ray is liable to exist. Therefore, when the boundary surfaces 124 and 126 are designed, consideration is made so that the ray can travel straight to the second refraction surface 132 in the image enlarging panel 26.

Figure 8:
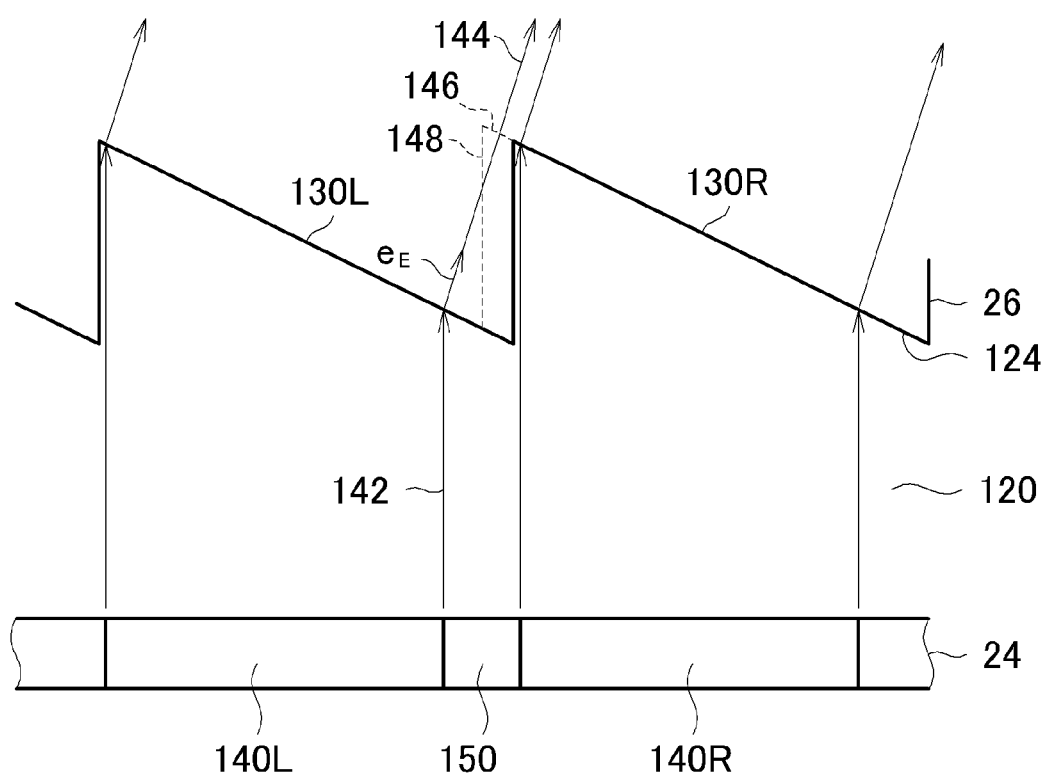
FIG. 8 is a schematic view of a part of the vertical cross section of the image enlarging panel according to the third embodiment.

This point is described with reference to FIG. 8. FIG. 8 is a schematic view of a part of a vertical cross section of the boundary surface 124 of the image enlarging panel 26 and the liquid crystal panel 24. The boundary surface 124 in which a plurality of first refraction surfaces 130 are arranged becomes discontinuous at the boundary of the first refraction surfaces 130. For example, as illustrated in FIG. 8, at a cross section of the image enlarging panel 26 from the center toward the edge, the boundary surface 124 has a saw-tooth shape. A ray entering from a pixel 140L to a first refraction surface 130L corresponding to the pixel 140L is refracted so as to close to a first refraction surface 130R corresponding to an adjacent pixel 140R and becomes a ray which obliquely travels in the image enlarging panel 26. In this embodiment, the boundary surface is formed so that refracted light 144 at the first refraction surface 130L of outgoing light 142 exiting from the edge portion of the pixel 140L on the pixel 140R side travels straight to the second refraction surface (not shown). Specifically, regarding the boundary surface 124, for example, when the boundary surface is shaped as indicated by a dotted line 146 in FIG. 8, the ray 144 may exit to the air layer 120 again to enter the first refraction surface 130R of the adjacent pixel 140R, or may be totally reflected at a stepped surface 148 connecting the first refraction surfaces 130L and 130R. The boundary surface 124 is shaped so as to avoid occurrence of those phenomena. For example, consideration is made so that a position in the XY plane of an outline of the first refraction surface 130R corresponding to the adjacent pixel 140R, which is on a side which becomes a concave portion at the boundary surface 124 (pixel 140L side), is set to match the boundary of the pixel 140R, and a horizontal distance between the incident position of the ray 142 to the first refraction surface 130L and the concave portion of the first refraction surface 130R is set as large as possible, specifically, set to a width of a region of a black matrix 150 between the pixels 140L and 140R. Moreover, consideration is made so that the distance $\Delta z$ between the first refraction surface 130L and the second refraction surface corresponding thereto is increased to set the inclination of the first refraction surface 130L small, to thereby set the inclination of the directional vector $e_E$ of the ray 144 toward the first refraction surface 130R of the adjacent pixel small.

According to the present invention that has been described by means of the first to third embodiments, it is possible to suppress image distortion and the shift of the image depending on the viewing point, to thereby enable correct image display. In addition, the ratio of the effective display region in the front surface is enlarged, and thus a liquid crystal display device which is frame-less or has a narrow frame may be obtained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a planar light source that emits parallel rays;
    a transmissive liquid crystal panel which comprises a plurality of pixels arranged in an image formation region, the plurality of pixels passing through the parallel rays applied to a rear surface of the transmissive liquid crystal panel and each of the plurality of pixels outputting the parallel rays as a unit parallel ray in pixel unit, to thereby form an original image on a front surface of the image formation region;
    an optical panel, which is an optical element having a flat-plate shape and arranged so that a rear surface thereof is directed to the transmissive liquid crystal panel, for enlarging the original image to form a display image on a front surface of the optical panel, the optical panel causing the unit parallel ray of each of the plurality of pixels, except for a ray that passes through a center of the optical panel, to obliquely travel by refraction so that an incident position and an exit position of the unit parallel ray are shifted from each other in a flat-plate plane, thereby causing the unit parallel ray to exit from a pixel projection section corresponding to the each of the plurality of pixels at an image display region which forms the display image; and
    viewing angle enlarging means which is arranged so that a rear surface thereof is directed to the optical panel, and allows the unit parallel ray from the optical panel to enter, the viewing angle enlarging means generating a dispersed ray by expanding an angular distribution of the unit parallel ray and exiting the dispersed ray from a front surface of the viewing angle enlarging means, thereby enlarging a viewing angle of the display image,
    wherein the optical panel comprises a laminated structure comprising:
    a rear surface layer positioned on the rear surface side of the optical panel;
    a front surface layer positioned on the front surface side of the optical panel; and
    an intermediate layer sandwiched between the rear surface layer and the front surface layer;
    the rear surface layer and the front surface layer each have a refractive index that is higher than a refractive index of the intermediate layer;
    the optical panel further comprises, for the each of the plurality of pixels:
    a first refraction surface, which is a part of a boundary surface between the rear surface layer and the intermediate layer, the part being opposed to the each of the plurality of pixels; and a second refraction surface, which is a part of a boundary surface between the intermediate layer and the front surface layer, the part being opposed to the pixel projection section corresponding to the each of the plurality of pixels;

the first and second refraction surface each comprising a first planar surface extending in a normal direction and a second planar surface extending obliquely to the normal direction;

a direction of the first refraction surface of the each of the plurality of pixels and an interval between the first refraction surface and the second refraction surface in the normal direction toward the optical panel are set so that the unit parallel ray which is refracted at the first refraction surface and obliquely travels in the intermediate layer enters the second refraction surface; and a direction of the second refraction surface is set so that the unit parallel ray obliquely traveling in the intermediate layer is refracted toward the normal direction.

* * * * *